(12) United States Patent
Friedrich et al.

(10) Patent No.: US 6,546,899 B1
(45) Date of Patent: Apr. 15, 2003

(54) METHOD AND DEVICE FOR INCREASING THE USE OF THE BRAKING MOMENT OF A RETARDER IN AN AUTOMOBILE

(75) Inventors: Jürgen Friedrich, Crailsheim (DE); Klaus Vogelsang, Crailsheim (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 09/830,191

(22) PCT Filed: Oct. 12, 1999

(86) PCT No.: PCT/EP99/07624
§ 371 (c)(1),
(2), (4) Date: Jun. 28, 2001

(87) PCT Pub. No.: WO00/24622

PCT Pub. Date: May 4, 2000

(30) Foreign Application Priority Data

Oct. 22, 1998 (DE) .......................... 198 48 544

(51) Int. Cl.⁷ .................................. F01P 1/06
(52) U.S. Cl. .................................. 123/41.31
(58) Field of Search .............. 123/41.31, 41.33, 123/41.12, 41.51, 320

(56) References Cited

U.S. PATENT DOCUMENTS

| 5,261,513 A | 11/1993 | Vogelsang |
| 5,531,190 A | 7/1996 | Mork |
| 5,609,125 A | 3/1997 | Ninomiya |

FOREIGN PATENT DOCUMENTS

| DE | 2359942 | | 6/1975 |
| DE | 19637316 | * | 3/1997 |
| DE | 19641558 | | 4/1998 |
| DE | 29707304 | | 8/1998 |
| DE | 19716919 | * | 10/1998 |
| WO | WO-9427845 | * | 8/1994 |
| WO | 9501500 | | 1/1995 |

* cited by examiner

Primary Examiner—Henry C. Yuen
Assistant Examiner—Hyder Ali
(74) Attorney, Agent, or Firm—Ostrolenk, Faber, Gerb & Soffen, LLP

(57) ABSTRACT

The invention relates to a method and a device for increasing the use of the braking moment of a retarder in an automobile. According to this method, the heat produced by the retarder during braking is dissipated using a coolant. The method is characterized in that at least one auxiliary consumer and/or at least one of the following devices of the cooling system—a connected fan, a connected thermostat, a coolant pump, a bypass-valve—is controlled in dependence on the mode of the operation of the retarder.

23 Claims, 1 Drawing Sheet

METHOD AND DEVICE FOR INCREASING THE USE OF THE BRAKING MOMENT OF A RETARDER IN AN AUTOMOBILE

BACKGROUND OF THE INVENTION

The invention relates to a method for increasing the utilization of the braking torque of a retarder in a motor vehicle. The invention further relates to conducting away heat generated in the retarder during the braking operation using a coolant. The invention also relates to operating secondary loads in a cooling system even if not required.

In order to cool vehicle components, for example hydrodynamic brakes, internal combustion engines, etc., use is generally made today of coolant circuits comprising a coolant, preferably water with appropriate antifreeze additives. In such circuits, a specific quantity of coolant per time unit flows through the component to be cooled. The coolant absorbs heat that is to be conducted away from the component and conveys the heat to a radiator, for example a ribbed radiator, or to a heat exchanger. The radiator or exchanger outputs the absorbed and conveyed quantity of heat into the environment or to another coolant circuit. The cooling power of such a system is determined essentially by the efficiency of the individual system components, for example the delivery capacity of the coolant pump.

In order to protect the engine cooling system against overheating when a retarder is switched on, it has therefore been proposed in

WO 94/27845 to reduce the retarder braking power as a function of the engine speed, and thus the speed of the coolant pump.

A disadvantage with this method or this control system is that the retarder braking torque is reduced very early, and as a result the braking power of the retarder is utilized only insufficiently.

SUMMARY

The object of the present invention is therefore to specify a method and a device for carrying out the method with which the disadvantages of the prior art are avoided and the retarder braking torque can be utilized better than hitherto, that is to say the retarder availability is increased.

This object is achieved according to the invention in that at least one secondary load and/or at least one of the following devices of the cooling system in the vehicle:

a switched fan a switched thermostat a coolant pump a bypass valve in the cooling circuit is actuated as a function of the instantaneous or future braking requirement.

It is particularly advantageous if at least the following retarder operating states:

switching on the retarder requested or actually selected braking level of the retarder are distinguished. In terms of actuation, the following variants are conceivable:

everything depends on the engine control system. It controls the engine, the fan and the retarder; or each of the aforesaid assemblies has its own control system and these communicate with one another; or retarder and fan have a common control system.

A particularly interesting variant consists in not sensing the instantaneous braking requirement or not exclusively sensing the instantaneous braking requirement, but also the future braking requirement in terms of predictive driving. The future braking requirement can be defined here by means of a navigation system in which the route ahead is examined by means of, for example, a satellite system (so-called global positioning system).

According to the invention, the retarder availability with respect to the maximum possible level of braking torque can be increased by virtue of the fact that a switched fan, for example that of the vehicle radiator, is connected into the circuit by the retarder electronics when the retarder switch-on instruction is present, as a result of which the efficiency of the cooling system is increased.

In order to avoid fuel being used unnecessarily by the fan which is connected into the circuit when the retarder is switched off, there is provision that when the retarder is OFF instruction is present, the fan is enabled again or switched off. Actuation takes place then only by means of the sensors of the engine cooling system. As an alternative to switching off or enabling the fan when the retarder is switched off, there may also be provision to switch off or enable the fan when the retarder braking torque drops below a specific value that is predefined at a low level.

In addition to a pure on/off logic system as described above, it is advantageously provided that in the case of multi-step fans or infinitely adjustable fans the actuation of the fan is carried out as a function of the requested retarder braking power, for example the selected retarder braking level. In principle, the fan according to the invention operates with a high rotational speed at high retarder braking levels, whereas at low retarder braking levels the fan is either entirely enabled or runs with only a reduced rotational speed.

In a further, developed embodiment of the invention, there may be provision for the thermostat which is preferably embodied as a 2/3-way valve in, for example, the coolant circuit of the vehicle cooling system to be switched as a function of retarder operating states.

There may be provision that if the cooling system is running in the bypass mode, i.e. the coolant fluid is being conducted past the vehicle radiator, the 2/3-way valve is actuated, after the retarder is switched on, in such a way that coolant fluid flows through the vehicle radiator in order to increase the cooling power of the cooling system.

The retarder availability can be increased further if not only the fan and the bypass valve are actuated as a function of the braking requirement but also a coolant pump, if said pump is one whose rotational speed can be actuated or regulated. In such embodiments there may be provision that the rotational speed of the coolant pump is increased when the retarder is switched on and decreased to the normal level when the retarder is switched off. With a coolant pump whose rotational speed can be adjusted, it is also possible to select the rotational speed as a function of the selected retarder braking level.

So that the heat generated by the retarder can be conducted away better than hitherto and not exclusively by means of the cooling system and from there into the environment, there is provision that secondary loads in the vehicle which do not have to be permanently in use are switched on if the retarder is switched on, in order to convert the braking work into useful work, with the result that the energy can be utilized more appropriately.

If the retarder is a secondary retarder, and there is no need whatsoever to restrict the invention to this, a separate heat exchanger is generally assigned to said secondary retarder. If the heat exchanger circuit has, like the engine cooling system, a bypass, in a particular refinement of the invention it is possible to operate the bypass similarly to the operation of the radiator bypass valve. The heat exchanger bypass in this instance is connected in a way analogous to the radiator bypass valve. That is, coolant is conducted through the heat exchanger when relevant for the braking mode of the retarder, and past the heat exchanger when the retarder is switched off.

In addition to the method described above, the invention also makes available a control device for carrying out the method. According to the invention there is provided a control or regulating system that comprises means, for example sensors, for sensing the retarder operating states or the instantaneous or future braking state. The system further comprises a control/regulating device that actuates vehicle assemblies such as secondary assemblies and/or devices of the cooling system as a function of the retarder braking states detected.

BRIEF DESCRIPTION OF THE DRAWINGS

An example of the invention will now be explained with reference to the drawings, in which.

DETAILED DESCRIPTION OF THE PREFERRED EMBODIMENTS

Figure 1:
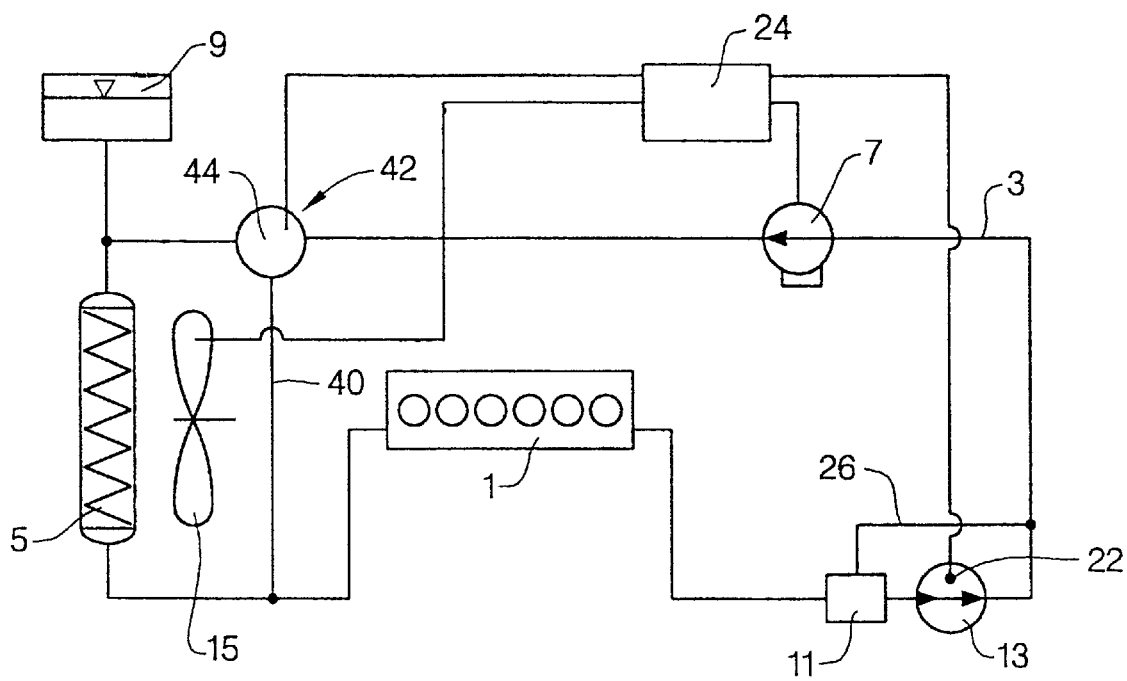
FIG. 1 is a schematic view of a vehicle cooling system according to the invention with a retarder which operates as a primary retarder.

FIG. 1 represents a drive unit composed of an engine 1 and a cooling circuit 3. The cooling circuit 3 comprises a radiator 5, a coolant pump 7, which is configured here as a coolant pump regulated whose rotational speed is regulated, and an equalization vessel 9, which always ensures that there is adequate overpressure on the pump intake side. The embodiment illustrated in FIG. 1 is a primary retarder 13 which is arranged in the cooling circuit. By means of the switch-over valve 11 it is possible to conduct coolant past the vehicle when the retarder is switched off. The invention is, however, not restricted in any way to primary retarders which, as in FIG. 1, are arranged in the coolant circuit of the engine. The invention can also be applied even if the coolant circuit is separated from the engine and retarder.

A bypass line 40 leads past the radiator and branches at the point 42. At the point 42, a switch-over valve or thermostat 44 is arranged which can be configured as a 3/2-way valve. The 3/2-way valve has the function of controlling the coolant flow in such a way that it can be conducted either through the radiator or else through the bypass line 40 past the radiator. It is generally the case that the 3/2-way valve conducts the coolant stream to the radiator 5 partially or for the greater part in operating phases in which a large amount of heat is conducted away. In the phase in which a small amount of heat is conducted away, the 3/2-way switch-over valve 44 directs the coolant to the engine 1 or to the pump 7 via the bypass line. The 3/2-way valve can be embodied as an expansible-material-regulated valve or as an electrical or pneumatic continuously variable valve.

The fan 15 is arranged downstream of the vehicle radiator 5 as a further assembly of the cooling system. The fan 15 is preferably of switchable design. The retarder operating state, i.e. switched-on retarder, switched-off retarder, braking level of the retarder, is detected, for example, by the sensor 22 or by the retarder operator lever which is not illustrated here, tapped and transmitted to the control/regulating unit 24.

As a function of the sensed or transmitted signal, the control/regulating unit 24 controls the various assemblies of the cooling system such as the fan, 3/2-way valve or else vehicle secondary assemblies which are not continuously in use and via which heat can be conducted away.

For example, the fan 15 can be activated when the retarder is switched on, and the cooling power of the vehicle cooling system can thus be increased. As a result, the full braking power or the maximum braking torque of the retarder is available immediately when the retarder is switched on.

If the switch-over valve 44 is in the bypass position and the heat is being conducted past the radiator via the bypass 40, said switch-over valve 44 can, like the fan 15, be activated so that the coolant is conducted through the radiator 5. Of course, in a particular advantageous refinement, it is possible to co-ordinate the activation of the switch-over valve 44 and thus the fan 15. In this way, for example, the switch-over valve 44 can be switched to a setting in which there is a flow through the radiator 5 and the rotational speed of the fan 15 is then increased. If the requested braking power of braking torque drops below a specific value, the fan 15 can firstly be switched off. The switch-over valve 44 is not switched to bypass mode again unit the retarder is completely switched-off.

In one developed embodiment, there may be provision for the rotational speed of the fan to be controlled as a function of the respective retarder braking level. For example, the rotational speed of the fan can be increased at a high retarder braking level, i.e. high braking torque request, and thus a requirement for a large amount of heat to be conducted away, while it is reduced when low braking torque is requested.

In addition to the fan 15 and the switch-over valve 44, a rotational-speed-regulated coolant pump 7 is provided in the embodiment of a vehicle cooling system illustrated in FIG. 1.

The rotational-speed-regulated coolant pump 7 is also actuated by the control/regulating device 24. It is possible, for example when a retarder ON instruction is present, to adjust the rotational speed of the coolant pump to a predetermined, significantly higher value than during normal driving mode. The delivery capacity in the coolant circuit is increased and more heat can be conducted away than during the normal mode.

If the braking torque or the requested braking power drops below a specific value, the rotational speed of the pump 7 can be reduced to the value required solely by the engine cooling system when the retarder is switched off. By reducing both the rotational speed of the pump 7 and that of the fan 15 and switching over the bypass valve 44 when the retarder OFF instruction is present, it is possible to minimize the fuel consumption in the driving mode because components which are not required do not operate at the same time.

On the other hand, by connecting into the circuit the above-mentioned assemblies when a retarder ON instruction is present or at a predefined braking level, the retarder availability is increased in comparison with the previously known control/regulating systems.

Figure 2:
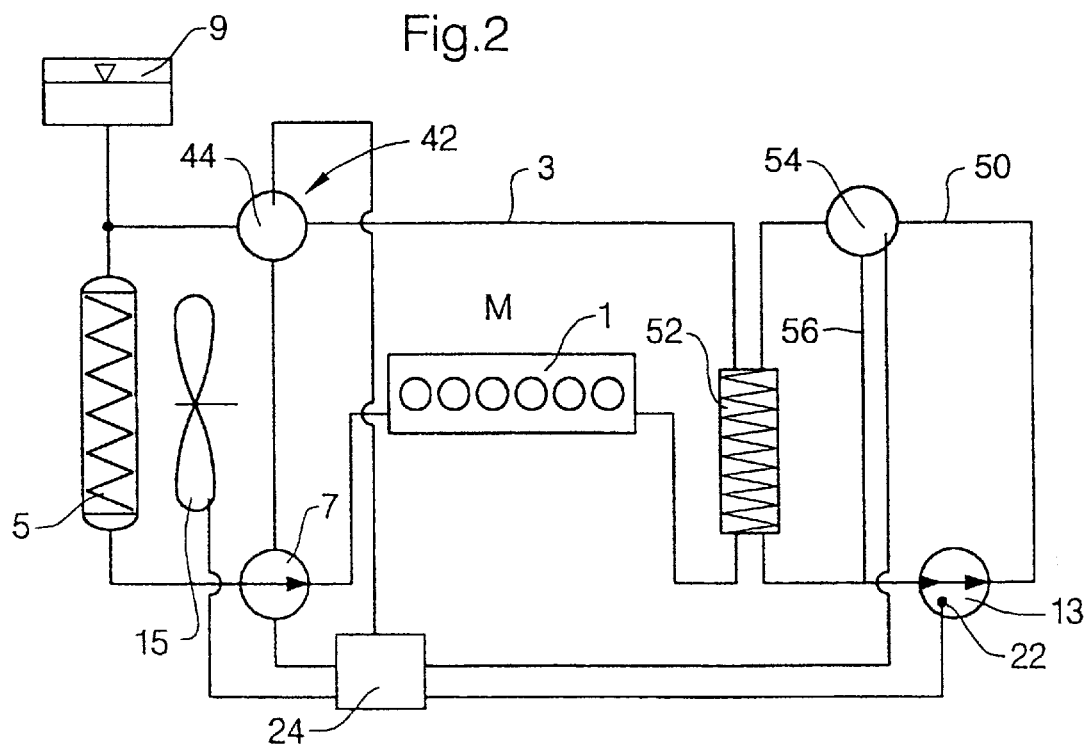
FIG. 2 is a schematic view of a vehicle cooling system according to the invention with a retarder which operates as a secondary retarder.

FIG. 2 illustrates an alternative embodiment of the invention. The coolant circuit 3 of the engine 1 is illustrated again.

In contrast with the, retarder illustrated in FIG. 1, the retarder 13 in FIG. 2 is a so-called secondary retarder which is preferably arranged on the vehicle transmission or on the output shaft. The conduction away of heat in such a system is preferably carried out by means of a separate retarder coolant circuit 50 which outputs the heat to the vehicle cooling system 3 via the heat exchanger 52.

As in FIG. 1, the fan 15, the switch-over valve 44 and the rotational-speed-regulated coolant pump 7 are actuated by means of the control/regulating device 24 given specific retarder operating states which are communicated to the control/regulating device 24 either by the sensor 22 or, for example, the retarder control operating lever.

In addition to this, in the embodiment according to FIG. 2 there may be provision that a switch-over valve 54 is also actuated in the retarder cooling circuit 50, specifically when the retarder is switched on, in such a way that the coolant is not conducted via the bypass 56 but rather via the-heat-exchanger 52.

In addition to the actuation of the assemblies of the cooling system which have been described in detail above, there may be provision that secondary assemblies in the vehicle which do not have to be continuously used are also actuated in order to promote the conduction away of heat. This measure can further increase the retarder availability.

The invention thus discloses for the first time a system with which the braking effect of a retarder can be utilized to a maximum degree directly after switching on by virtue of the fact that additional assemblies of the cooling system or secondary assemblies of the vehicle are actuated.

What is claimed is:

1. A method for improving an available operational range for a retarder in a motor vehicle with a cooling system having a single coolant pump, the method comprising:
   operating the retarder to thereby generate heat;
   circulating coolant to the retarder to draw off heat generated by the retarder;
   operating a cooling system valve to divert coolant to a heat dispersion unit when the retarder is operated;
   dispersing the heat in the coolant drawn from the retarder; and
   selectively operating a cooling enhancement device coupled to the cooling system, the operation of the cooling enhancement device being related to selective operation of the retarder, thereby improving a capacity of the cooling system to disperse heat, whereby the available operational range of the retarder is increased.

2. A method according to claim 1, wherein the cooling enhancement device comprises at least one of a switched fan, a switched thermostat, the single coolant pump or a bypass valve.

3. A method according to claim 1, further comprising providing retarder operational states for the retarder.

4. A method according to claim 3, wherein the retarder operational states include at least one of a switched on state, a switched off state or a predefined retarder output level.

5. A method according to claims 1, further comprising:
   operating a fan when the retarder is operated; and
   permitting the fan to be operated conventionally when the retarder is not operated.

6. A method according to claim 5, further comprising controlling an output level of the fan in relation to a retarder output level.

7. A method according to claim 5, further comprising controlling an output level of the fan in relation to a coolant temperature.

8. A method according to claim 1, wherein the heat dispersion unit is at least one of a radiator and a heat exchanger.

9. A method according to claim 1, further comprising increasing an output level of the single coolant pump when the retarder is switched on.

10. A method according to claim 1, wherein the cooling system further comprises a secondary load capable of extracting heat from the cooling system, and the method further comprises selectively operating the secondary load in relation to operation of the retarder thereby improving the capacity of the cooling system and increasing the available operational range of the retarder.

11. A method according to claim 10, wherein the secondary load has a standard output level, the method further comprising operating the secondary load beyond the standard output level.

12. A method according to claim 1, further comprising operating the coolant enhancement device in relation to at least one of an instantaneous or a future retarder operation requirement.

13. A system for providing increased capacity for a retarder in a motor vehicle with a cooling system having a single cooling pump, the system comprising:
   a status signal output from the retarder related to an operational status of the retarder;
   a cooling system controller coupled to the retarder to receive the status signal output, the controller having a command output;
   a cooling device coupled to the cooling system and to the controller to receive the command output, the cooling device being actuated by the command output to influence efficiency of the cooling system based on the command output;
   a coolant fluid circulated in the cooling system;
   a heat dispersion unit in the cooling system for dispersing heat in the coolant fluid;
   wherein the cooling device is a valve coupled to the heat dispersion unit for shunting the coolant fluid through or by the heat dispersion unit;
   the controller is operable to provide the command output based on the status signal to thereby improve a capacity of the cooling system when the retarder is activated, the command output from the controller further comprises a valve actuation signal to shunt the coolant fluid to the heat dispersion unit when the retarder is operated.

14. A system according to claim 13, wherein the cooling device is at least one of a switched fan, a switched thermostat, the single cooling pump and a bypass valve.

15. A system according to claim 13, wherein the operational status of the retarder further comprises operational states including at least one of a switched on state, a switched off state or a predefined retarder output level.

16. A system according to claim 13, wherein the cooling device further comprises a fan;
   the command output from the controller further comprises:
      an actuation signal to turn on the fan when the retarder is operated; and
      a non-actuation signal to permit the fan to be operated conventionally when the retarder is not operated.

17. A system according to claim 16, wherein the status signal output further comprises a retarder output level; and
   the command output further comprises a fan output level command for controlling a fan output level in relation to the retarder output level.

18. A system according to claim 16, further comprising:
   a sensed coolant temperature value; and the command output further comprises a fan output level command for controlling a fan output level in relation to the coolant temperature value.

19. A system according to claim 13, wherein the heat dispersion unit is at least one of a radiator and a heat exchanger.

20. A system according to claim 13, wherein:

the coolant pump is coupled to the controller to receive the command output; and the command output further comprises a coolant pump output level command for controlling a coolant pump output level in relation to the status signal output from the retarder, whereby the coolant pump output level can be increased when the retarder is switched on.

21. A system according to claim 13, further comprising:

a secondary load capable of extracting heat from the cooling system and coupled to the controller to receive the command output; and the command output further comprises a secondary load command signal to actuate the secondary load, whereby the controller can selectively actuate the secondary load in relation to operation of the retarder thereby improving the capacity of the cooling system and increasing the available operational range of the retarder.

22. A system according to claim 21, further comprising:

a standard output level for the secondary load; and the secondary load command signal includes a signal level to actuate the secondary load beyond the standard output level to further improve the capacity of the cooling system.

23. A system according to claim 13, further comprising:

at least one of an instantaneous and a future retarder operation requirement; and the controller is further operable to provide the command output based on the at least one of an instantaneous and a future retarder operation requirement.

* * * * *